(12) United States Patent
Biskeborn et al.

(10) Patent No.: US 9,779,766 B1
(45) Date of Patent: Oct. 3, 2017

(54) HIGH ACCURACY TAPE BEARING SURFACE LENGTH DEFINITION PROCESS BY CLOSURE LAPPING FOR TAPE HEAD FABRICATION

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/333,034

(22) Filed: Oct. 24, 2016

(51) Int. Cl.
| G11B 5/127 | (2006.01) |
| H04R 31/00 | (2006.01) |
| G11B 5/31 | (2006.01) |
| G11B 5/008 | (2006.01) |
| B24B 37/20 | (2012.01) |

(52) U.S. Cl.
CPC ............ *G11B 5/3169* (2013.01); *B24B 37/20* (2013.01); *G11B 5/00813* (2013.01)

(58) Field of Classification Search
CPC .......... B24B 37/11; C23F 11/04; C23F 11/10; C23F 17/00; G11B 5/1272; G11B 5/00183; G11B 5/187; G11B 5/255; G11B 5/3169; G11B 5/40
See application file for complete search history.

(56) References Cited

U.S. PATENT DOCUMENTS

| 4,624,048 A * | 11/1986 | Hinkel ................... G11B 5/102 216/102 |
| 5,718,035 A * | 2/1998 | Yamanaka ........... G11B 5/3163 29/417 |
| 6,081,991 A * | 7/2000 | Tsunoda ............... G11B 5/6005 29/603.08 |
| 7,167,339 B2 | 1/2007 | Biskeborn et al. |
| 8,351,162 B2 * | 1/2013 | Etoh .................... G11B 5/1278 360/121 |

(Continued)

FOREIGN PATENT DOCUMENTS

JP  H11214588 A  8/1999

OTHER PUBLICATIONS

Notice of Allowance from U.S. Appl. No. 15/289,030, dated Mar. 10, 2017.

(Continued)

*Primary Examiner* — Paul D Kim
(74) *Attorney, Agent, or Firm* — Zilka-Kotab, P.C.

(57) ABSTRACT

A method according to one embodiment includes coupling closures to a section having a plurality of rows of transducers formed on a substrate, the closures being coupled to the section on an opposite side of the transducers as the substrate. The section is coupled to a lapping-resistant guide, where the closures protrude beyond a lap-stop end of the guide. The closures are lapped for shortening the closures in a direction toward the transducers, wherein the lapping is terminated after the guide contacts a lapping surface. A method according to another embodiment includes coupling closures to a section having a plurality of rows of transducers formed on a substrate. The closures are lapped for shortening the closures in a direction toward the transducers. An extent of the lapping is determined using an optical and/or a contact technique.

9 Claims, 12 Drawing Sheets

(56) References Cited

U.S. PATENT DOCUMENTS

| | | | |
|---|---|---|---|
| 8,675,310 | B2 | 3/2014 | Biskeborn et al. |
| 9,704,514 | B1 | 7/2017 | Biskeborn et al. |
| 9,711,170 | B1 | 7/2017 | Biskeborn et al. |
| 2002/0094758 | A1* | 7/2002 | Reiley ............ B24B 37/005 451/8 |
| 2003/0076631 | A1 | 4/2003 | Torline et al. |
| 2004/0223261 | A1 | 11/2004 | Deshpande et al. |
| 2005/0122631 | A1 | 6/2005 | Biskeborn et al. |
| 2005/0128638 | A1 | 6/2005 | Koeppe et al. |
| 2005/0168874 | A1 | 8/2005 | Biskeborn et al. |
| 2006/0292968 | A1 | 12/2006 | Fujii |
| 2007/0047141 | A1 | 3/2007 | Biskeborn et al. |
| 2008/0049358 | A1 | 2/2008 | Biskeborn et al. |
| 2014/0087089 | A1 | 3/2014 | Biskeborn et al. |

OTHER PUBLICATIONS

Biskeborn et al., U.S. Appl. No. 15/289,002, filed Oct. 7, 2016.
Biskeborn et al., U.S. Appl. No. 15/289,030, filed Oct. 7, 2016.
Biskeborn et al., U.S. Appl. No. 15/297,002, filed Oct. 18, 2016.
List of IBM Patents or Patent Applications Treated as Related.
Biskeborn et al., U.S. Appl. No. 15/369,651, filed Dec. 5, 2016.
Restriction Requirement from U.S. Appl. No. 15/289,030, dated Dec. 6, 2016.
Restriction Requirement from U.S. Appl. No. 15/289,002, dated Dec. 7, 2016.
Restriction Requirement from U.S. Appl. No. 15/297,002, dated Dec. 7, 2016.
Non-Final Office Action from U.S. Appl. No. 15/297,002, dated Feb. 27, 2017.
Notice of Allowance from U.S. Appl. No. 15/289,002, dated Mar. 2, 2017.
Supplemental Notice of Allowance from U.S. Appl. No. 15/289,030, dated Mar. 27, 2017.
Corrected Notice of Allowance from U.S. Appl. No. 15/289,002, dated Apr. 5, 2017.
Biskeborn et al., U.S. Appl. No. 15/488,272, filed Apr. 14, 2017.
Supplemental Notice of Allowance from U.S. Appl. No. 15/289,002, dated May 9, 2017.
Supplemental Notice of Allowance from U.S. Appl. No. 15/289,030, dated May 9, 2017.
Supplemental Notice of Allowance from U.S. Appl. No. 15/289,030, dated Jun. 5, 2017.
Supplemental Notice of Allowance from U.S. Appl. No. 15/289,002, dated Jun. 8, 2017.
Notice of Allowance from U.S. Appl. No. 15/297,002, dated Jun. 16, 2017.
Restriction Requirement from U.S. Appl. No. 15/488,272, dated Jul. 19, 2017.
Supplemental Notice of Allowance from U.S. Appl. No. 15/297,002, dated Aug. 1, 2017.

* cited by examiner

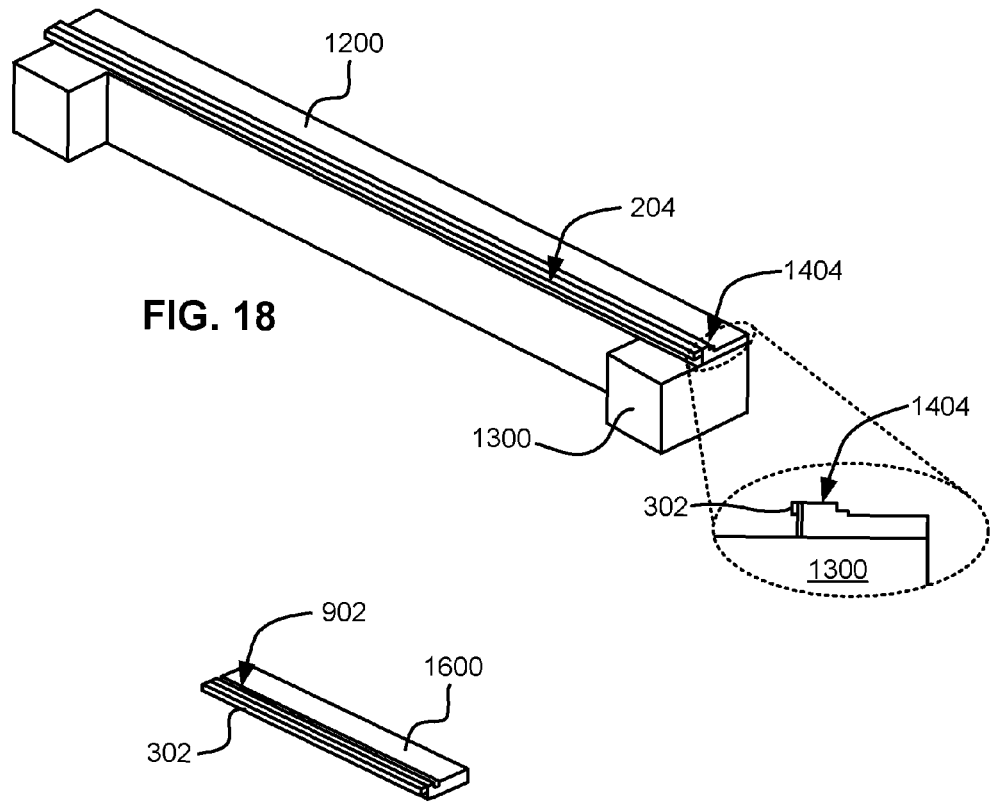
FIG. 18
FIG. 19
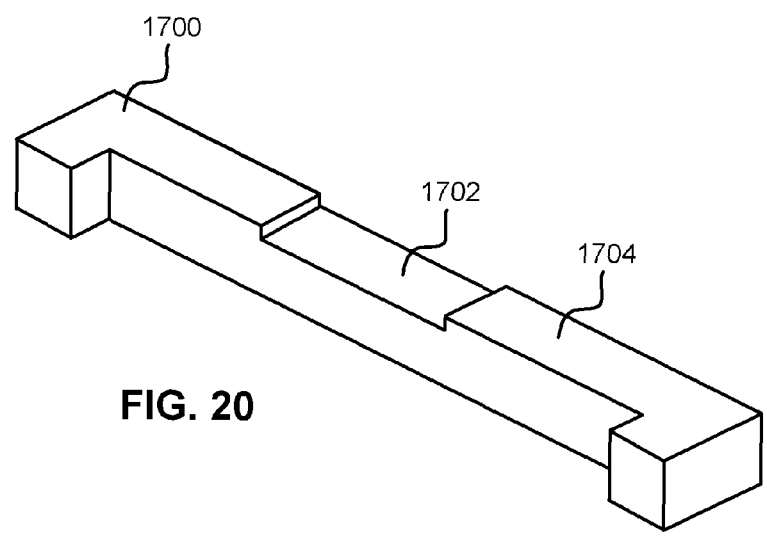
FIG. 20

HIGH ACCURACY TAPE BEARING SURFACE LENGTH DEFINITION PROCESS BY CLOSURE LAPPING FOR TAPE HEAD FABRICATION

BACKGROUND

The present invention relates to fabrication of magnetic heads, and more particularly, this invention relates to defining a tape bearing surface on a magnetic tape head.

Many modern electronic components are created by thin film wafer processing. One category of component created by thin film processing is the tape head. Another category is the disk head.

Most tape heads are currently built on wafers using thin film processes, similar to the wafers used for fabricating disk heads. However, the operating efficiency of disk heads and tape heads are inherently different. Disk recording/reading is very efficient, as the disk media is extremely flat and smooth, has a very thin magnetic layer, is in a sealed environment, and the heads are constructed to function with a particular media. Writing and reading tapes must address very different challenges. For example, the head should work with different tape brands, which can have different physical and magnetic properties. Furthermore, most tape is composed of magnetic particles, which are coated onto the tape surface. The resulting media can have variations in coating thickness and particle dispersion. This, coupled with spacing loss variations due to embedded wear particles and debris, requires that magnetic bits in tape be much larger than bits in disk media for achieving an acceptable signal-to-noise ratio.

Disk drive heads are designed to fly over smooth disk surfaces in a controlled manner at speeds exceeding 30 to 40 meters per second. By contrast, tape stacking and other requirements limit tape drive operating speeds to approximately 5 to 10 meters per second. Thus, to achieve data rates commensurate with disk drives, high performance linear tape drives typically employ heads having multiple transducers that operate simultaneously. For example, two transducers provide twice the data rate of one transducer, and modern heads have 32 transducers for each direction.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

For example, tolerances decrease as feature size decreases. Moreover, smaller components tend to be more fragile than their larger predecessors.

SUMMARY

A method according to one embodiment includes coupling closures to a section having a plurality of rows of transducers formed on a substrate, the closures being coupled to the section on an opposite side of the transducers as the substrate. The section is coupled to a lapping-resistant guide, where the closures protrude beyond a lap-stop end of the guide. The closures are lapped for shortening the closures in a direction toward the transducers, wherein the lapping is terminated after the guide contacts a lapping surface.

A method according to another embodiment includes coupling closures to a section having a plurality of rows of transducers formed on a substrate, the closures being coupled to the section on an opposite side of the transducers as the substrate. The closures are lapped for shortening the closures in a direction toward the transducers. An extent of the lapping is determined using an optical technique.

A method according to yet another embodiment includes coupling closures to a section having a plurality of rows of transducers formed on a substrate, the closures being coupled to the section on an opposite side of the transducers as the substrate. The closures are lapped shortening the closures in a direction toward the transducers. An extent of the lapping is determined using a contact technique.

Any of these embodiments may be implemented to fabricate a magnetic head usable with a magnetic data storage system such as a tape drive system, which may include the magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 18 is a perspective view of a module upon defining a skiving edge thereon.

FIG. 19 is a perspective view of a chip cut from a row.

FIG. 20 is a perspective view of a U-beam.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several embodiments for producing tape heads having a precisely-positioned tape bearing surface edge.

In one general embodiment, a method includes coupling closures to a section having a plurality of rows of transducers formed on a substrate, the closures being coupled to the section on an opposite side of the transducers as the substrate. The section is coupled to a lapping-resistant guide, where the closures protrude beyond a lap-stop end of the guide. The closures are lapped for shortening the closures in a direction toward the transducers, wherein the lapping is terminated after the guide contacts a lapping surface.

In another general embodiment, a method includes coupling closures to a section having a plurality of rows of transducers formed on a substrate, the closures being coupled to the section on an opposite side of the transducers as the substrate. The closures are lapped for shortening the closures in a direction toward the transducers. An extent of the lapping is determined using an optical technique.

In yet another general embodiment, a method includes coupling closures to a section having a plurality of rows of transducers formed on a substrate, the closures being coupled to the section on an opposite side of the transducers as the substrate. The closures are lapped shortening the closures in a direction toward the transducers. An extent of the lapping is determined using a contact technique.

Figure 1:
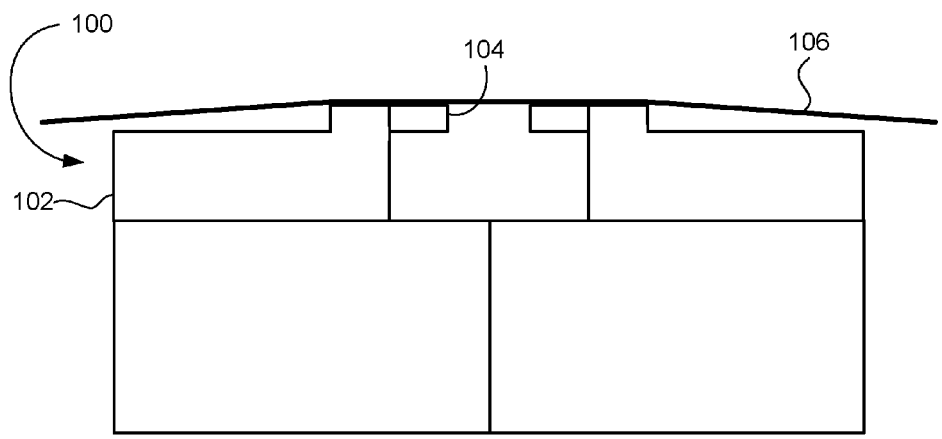
FIG. 1 is a side view of a tape head having closures.

One category of component created by thin film processing is the tape head. FIG. 1 depicts one such tape head 100. The head 100 includes a pair of head portions 102, each having a closure 104 that engages the tape 106 as it passes over the tape bearing surface of the head 100. The tape bearing surfaces may angle upwardly (towards the tape) so the tape wraps both substrate and closure edges.

Figure 2:
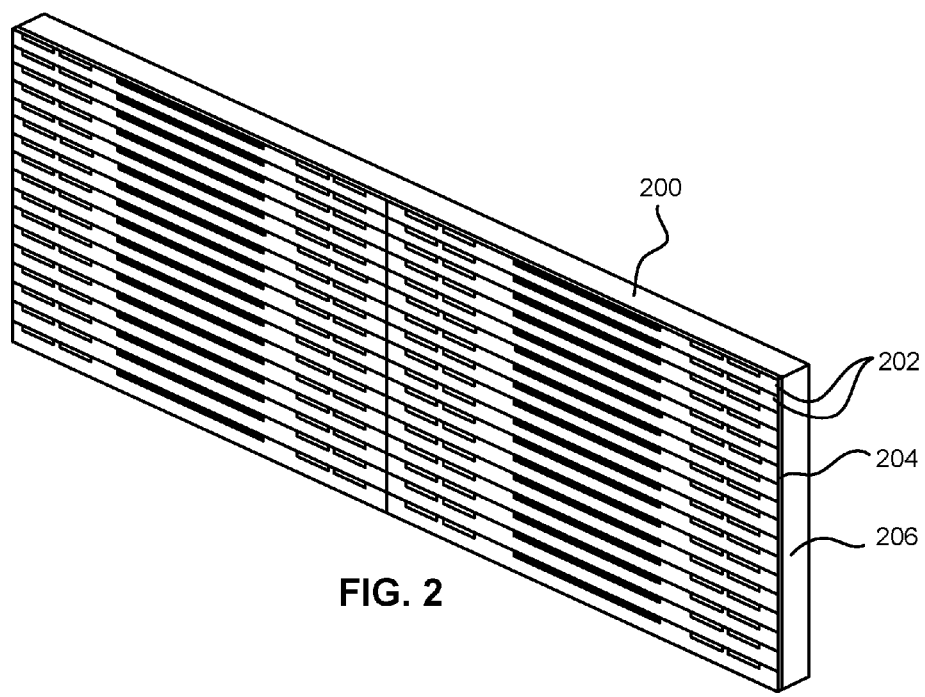
FIG. 2 is a perspective view of a section of a thin film wafer according to one embodiment.

According to the preferred method for forming the head, a wafer containing multiple "chips" each having read and/or write circuitry is formed by traditional thin film processing. The thin film wafer is cut into rectangular sections, sometimes called quads. FIG. 2 illustrates a section 200 of a thin film wafer according to one embodiment. As shown, the section 200 includes a plurality of rows 202 of circuitry formed in a layer 204 of thin films formed on a substrate 206. The section 200 will eventually be sliced and diced to form a head or chip. The circuitry may include, for example, read transducers, write transducers, servo transducers, electronic lapping guides, etc. Each row 202 can contain multiple head images. Thus, while each row contains two head images in this figure, rows built according to various embodiments may have more than two head images.

Figure 3:
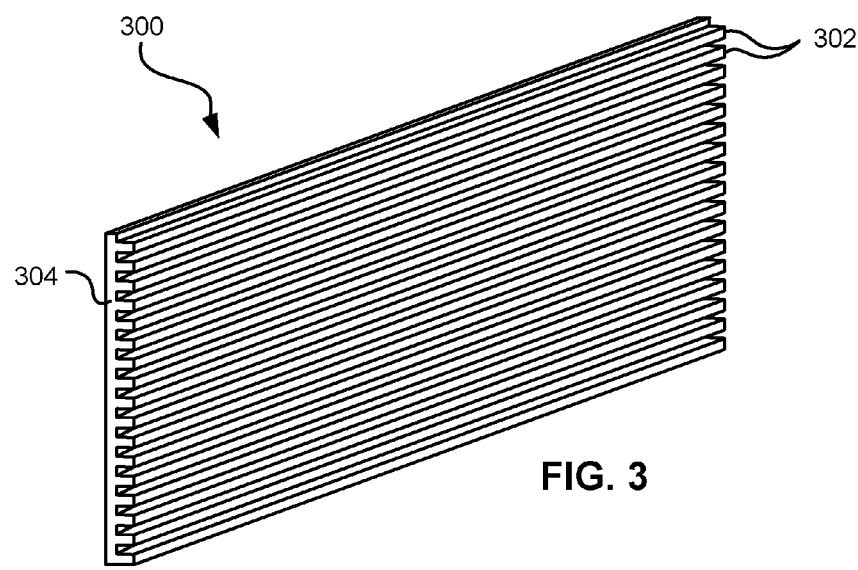
FIG. 3 is a perspective view of an array of closures.

FIG. 3 shows an array 300 of closures 302 that will be bonded to a section 200 of the wafer. The closures 302 may be of conventional construction. As shown, the closures 302 in this example extend from a top portion 304.

Figure 4:
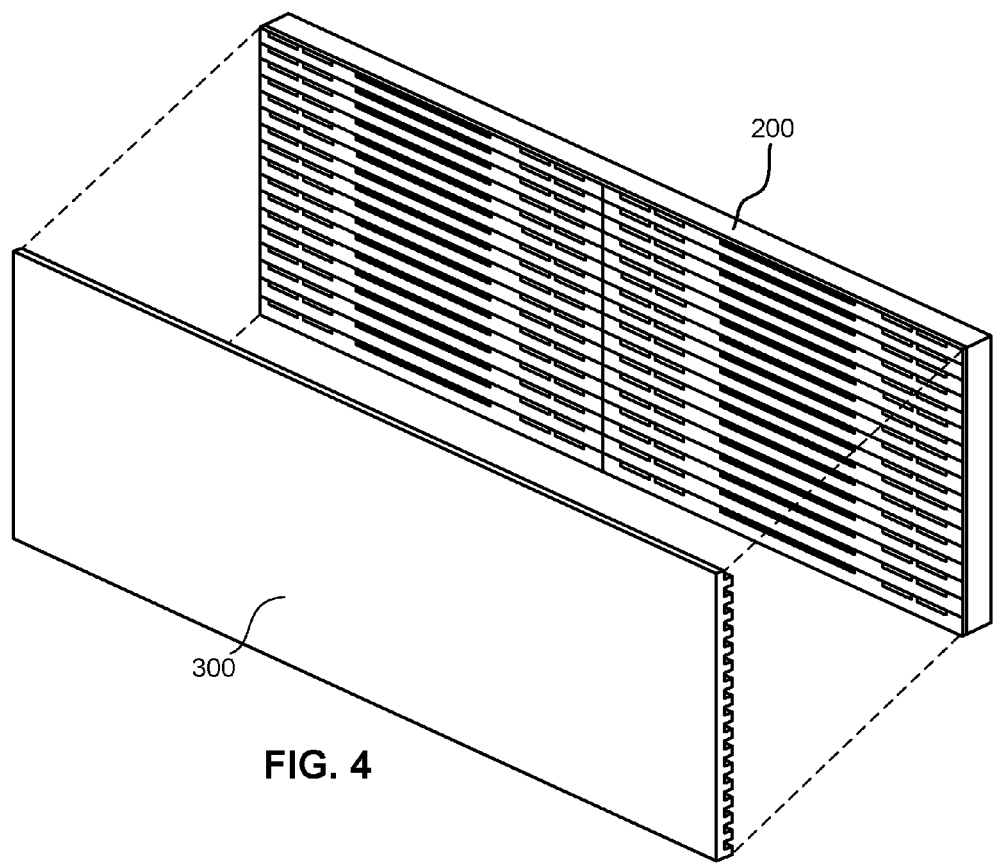
FIG. 4 is a perspective view depicting coupling of the array of closures to the section of wafer.

FIG. 4 illustrates how the array 300 is bonded to a section 200. A conventional adhesive may be used to bond the array 300 to the section 200.

Figure 5:
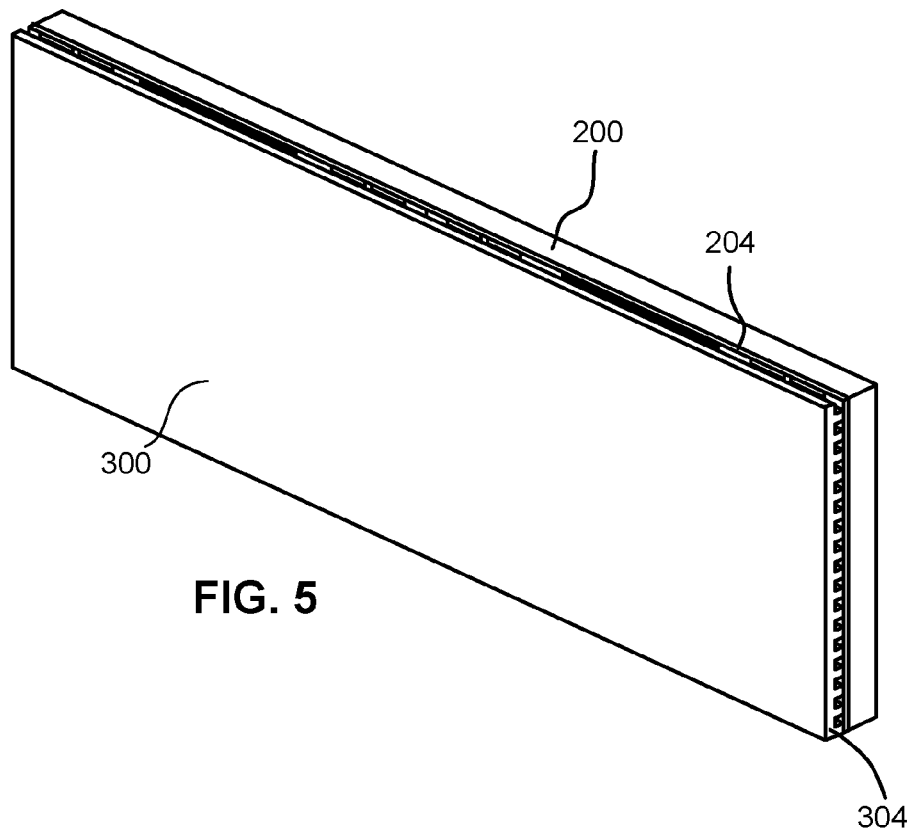
FIG. 5 is a perspective view of the array of closures coupled to the section of wafer.

FIG. 5 depicts the array 300 of closures 302 bonded to the section 200 of wafer. The top portion 304 of the array 300 of closures 302 may be removed prior to lapping the bearing surface of the section 200.

Figure 6:
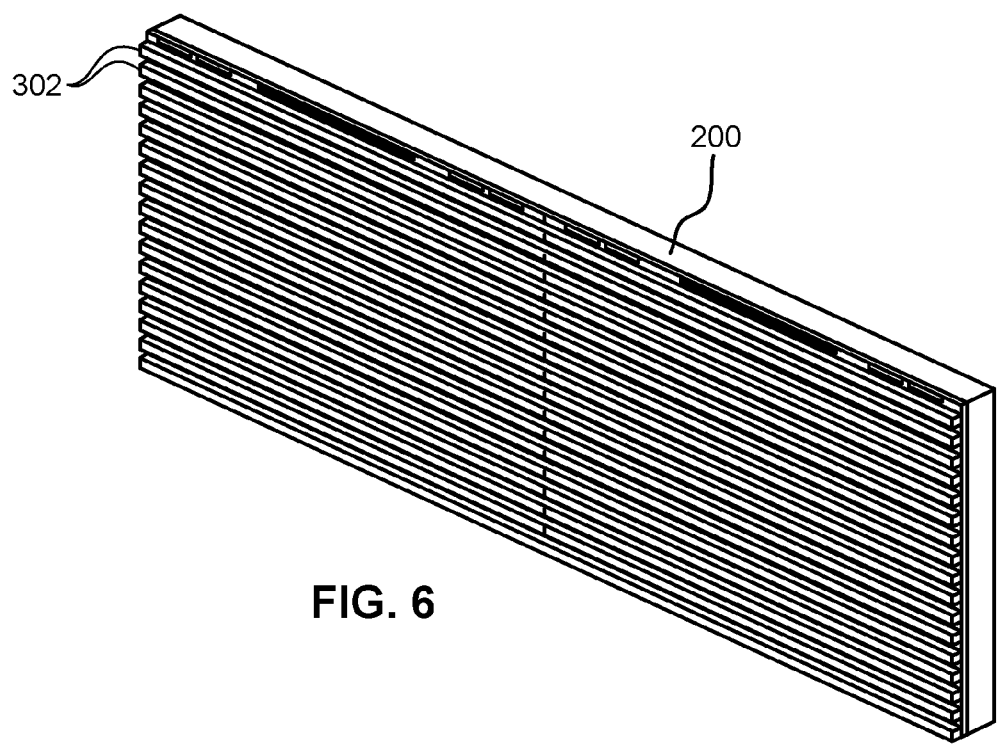
FIG. 6 is a perspective view of the closures coupled to the section of wafer upon removing a top portion of the array of closures.

FIG. 6 shows the closures 302 and section 200 with the top portion 304 of the array of closures 302 removed. The portions of the closure 302 remaining after processing support the tape as the tape passes over the head to protect the delicate electronics in the head from wear.

Portions of the closures 302 themselves may be removed to define the length of the tape bearing surface of each closure 302. Grinding, lapping, and/or other subtractive process (collectively referred to herein as "lapping") may be used. Various approaches may be used to shorten the lengths of the closures.

In one embodiment, the section is coupled to a guide. The guide may be any product or device that limits the extent of lapping of the closures by engaging the lapping surface. In a preferred approach, the guide includes a lapping-resistant portion, e.g., pads and/or bars, and in some approaches may be formed entirely of a lapping-resistant material. By "lapping-resistant," what is meant is that the portion of the guide that engages the lapping surface does not exhibit significant wear from the lapping surface, and/or exhibits at least an 75% lower lapping rate relative to the lapping rate of the closures in the lapping operation of interest. Accordingly, the guide acts to stop significant lapping of the closures upon the guide engaging the lapping surface. The lapping-resistant portion of the guide may include any material meeting one or both of the aforementioned constraints. Illustrative materials include carbides. In a particularly preferred approach, the guide or portion thereof is formed of hot pressed boron carbide ($B_4C$), e.g., hot pressed boron carbide sold under the trade name NORBIDE®, sold by Saint-Gobain Ceramics having a sales office at 23 Acheson Drive, Niagara Falls, N.Y. 14303.

The guide preferably at least partially encircles a lateral periphery of the section, and in some approaches fully encircles a lateral periphery of the section. The guide may be loosely coupled to the section, e.g., simply resting thereon, or more securely coupled, e.g., clamped thereto.

Figure 7:
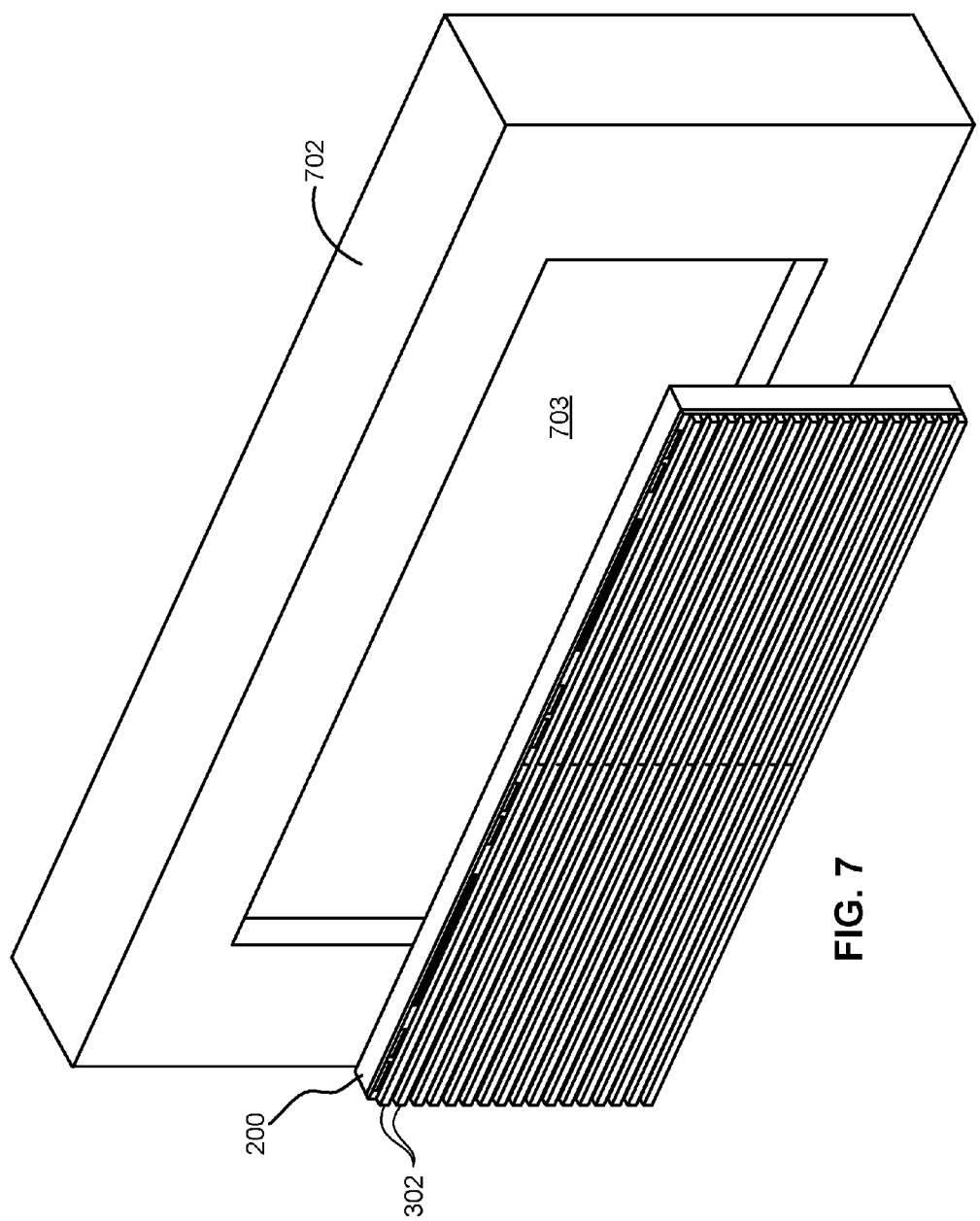
FIG. 7 is a perspective view of the section of FIG. 6 and a guide for limiting an extent of lapping of the closures.
Figure 8:
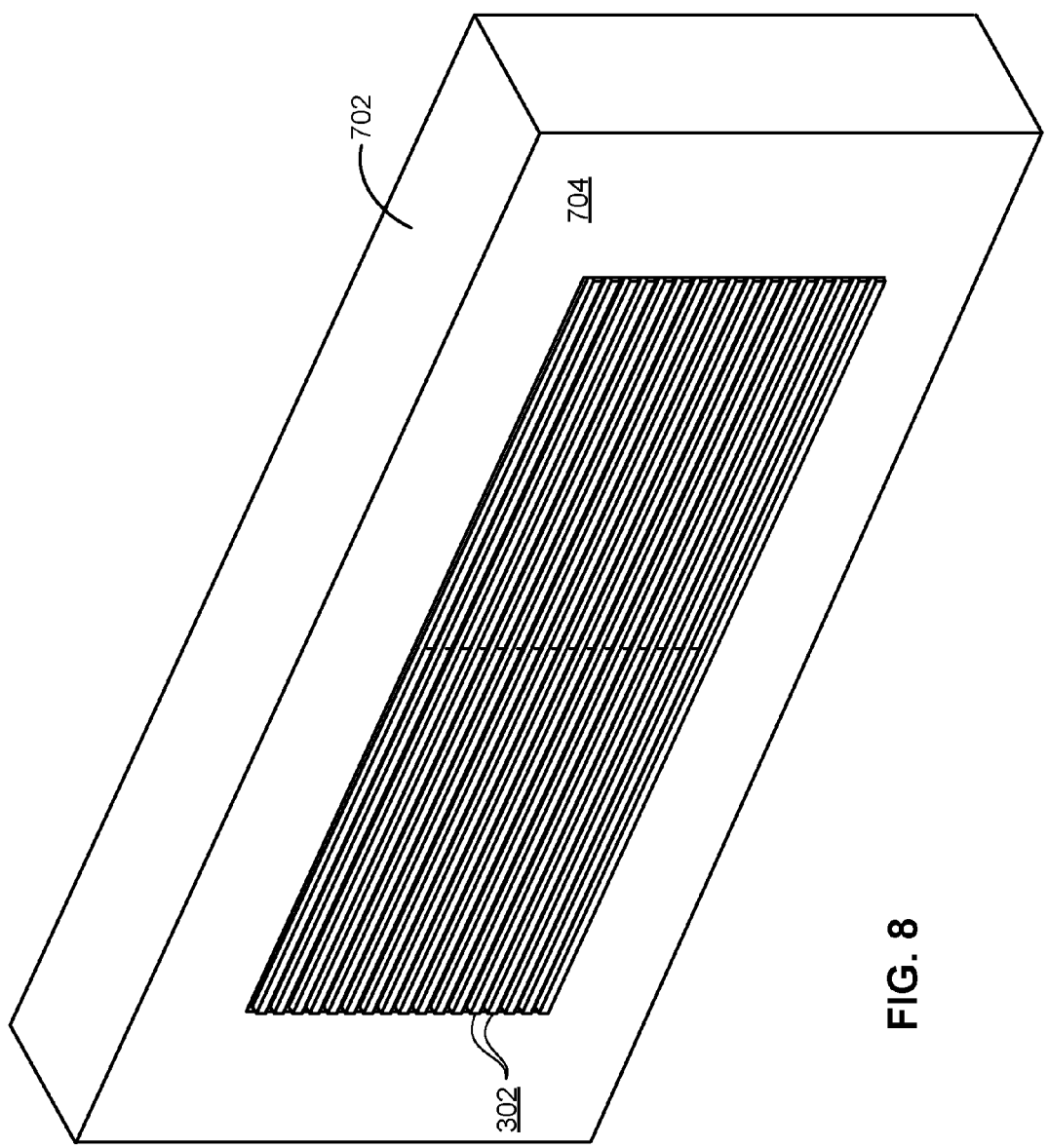
FIG. 8 is a perspective view of the section seated in the guide of FIG. 7.

FIG. 7 depicts an illustrative guide 702 that fully encircles a lateral periphery of the section when the section 200 is inserted in the recess 703 of the guide 702. Referring to FIG. 8, the section 200 is shown inserted in the guide 702. As shown, the closures protrude beyond a lap-stop end 704 of the guide, where the lap-stop end 704 of the guide eventually engages the lapping surface when the protruding portions of the closures are lapped away. Because the lap-stop end 704 of the guide is lapping-resistant, lapping of the closures diminishes and essentially stops as the lap-stop end 704 of the guide comes into contact with the lapping surface.

Figure 9:
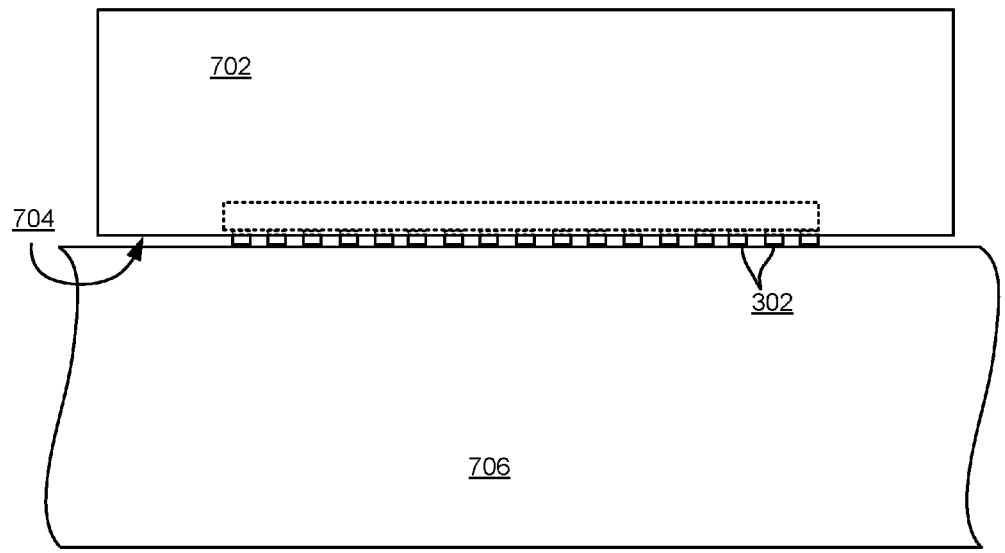
FIG. 9 is a perspective view of the section seated in the guide as in FIG. 8, prior to lapping of the closures.

FIG. 9 depicts the guide 702 and protruding closures 302 on a lapping surface 706 at the start of lapping. The lapping surface 706 may be a surface of a conventional lapping apparatus suitable for lapping the closures.

Figure 10:
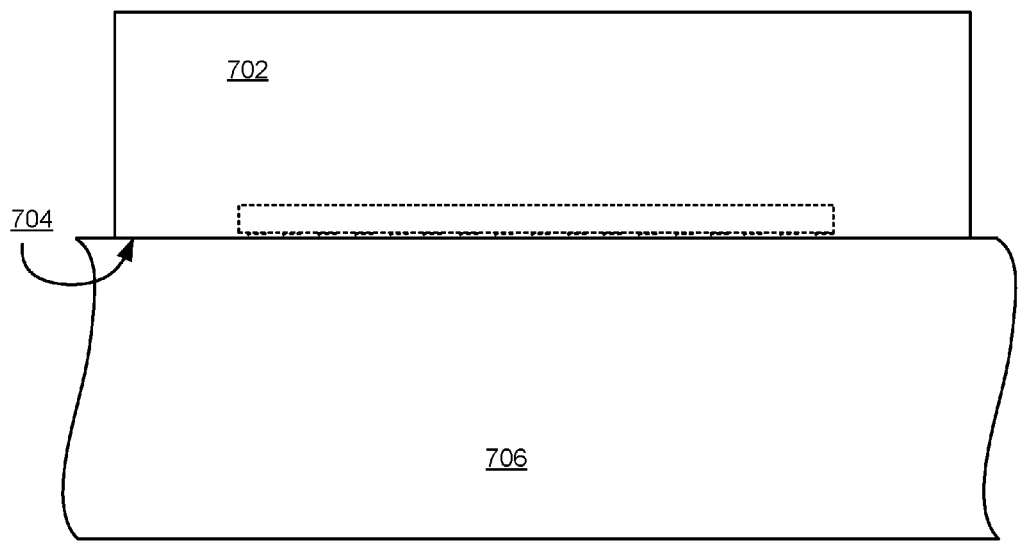
FIG. 10 is a perspective view of the section seated in the guide as in FIG. 9, after lapping of the closures.

FIG. 10 depicts the guide on the lapping surface 706 at the end of lapping. The guide 702 biases the section and closures toward the lapping surface 706 during the lapping, e.g., via gravity and/or a biasing mechanism, but the biasing exerted on the section and closures by the guide diminishes as the guide contacts the lapping surface 706.

Using a guide such as that shown in FIGS. 7-10, and variants thereof such as a guide having an array of pads with independently adjustable heights which may be adjusted prior to lapping, may provide several advantages. For example, the recess 703 in the guide 702 can be precisely dimensioned to provide the exact extent of lapping on a highly repeatable basis. Moreover, where the lap-stop surface of the guide has multiple points of contact or encircles the outer periphery of the section, the extent of lapping will tend to be substantially uniform across all closures.

In other embodiments, optical techniques may be used to control the extent of lapping of the closures. Such techniques may include coupling closures to a section of a thin film wafer having a plurality of rows of transducers formed on a substrate, as depicted in FIGS. 4-6. Optical techniques are used to determine an extent of the lapping of the closures for shortening the closures in a direction toward the transducers. Any conventional optical metrology technique may be used. In one approach, laser or other optical interferometry such as Wyco or Zygo white light optical interferometers, may be used. Such techniques may acquire data over a broad area of the array of closures.

In further embodiments, a contact measurement technique of any type known in the art, e.g., using a stylus profilometer, may be used to determine the lengths of the closures. Illustrative stylus profilometers are sold by KLA Tencor Corp. Such techniques may be performed at strategic locations to estimate the lengths of the closures across the section.

The lapping/inspection process may be iterative, whereby an extent of the lapping is detected using an optical technique, and additional lapping is performed to shorten the closures in the direction toward the transducers to about a desired length. In one approach, the results of the optical inspection may indicate how much more of the closures needs to be removed, and a temporal length of the additional lapping can be calculated based on the lapping rate.

Figure 11:
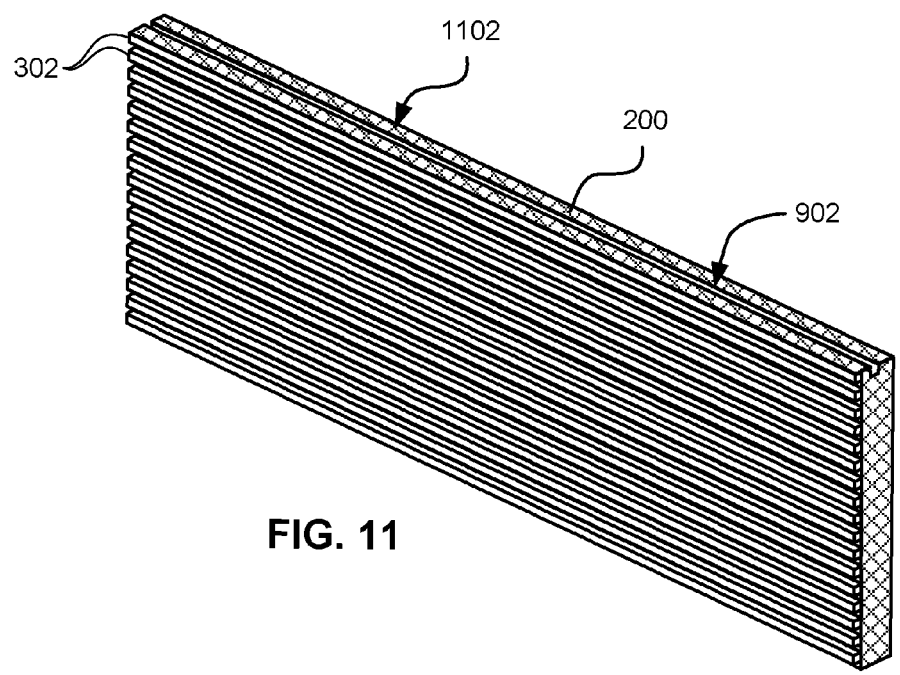
FIG. 11 is a perspective view of the section of wafer of FIG. 6 in an inverted position.

An exemplary closure lapping process will now be described. FIG. 11 shows the section 200 of FIG. 6 inverted from the orientation shown in FIG. 6. A slot 902 that defines the length of the tape bearing surface of the substrate is formed using conventional processes. The surface of the end 1102 is rough from the processing step in which the section is cut from the wafer, e.g., where a cutting blade is used to cut the section 200 from the wafer. All surfaces of peripheral ends of the section 200 and closures 302 typically have a similar roughness from the cutting step. In FIG. 11, a texture has been added to the drawing to exemplify the roughness of the surfaces of the section 200. This roughness degrades optical recognition of features on the end 1102, such as the location of the circuitry in the gap between the substrate upon which the circuitry is formed and the closure 302 and so reduces the precision of the height measurement. Therefore, optical positioning techniques are not accurate at locating references on the end 1102. This limited ability to precisely locate features on the end 1102 was not an issue for conventional head processing techniques, because a long tape bearing surface was desired. However, where a shorter tape bearing surface is desired and/or a skiving edge on each closure is to have a very specific placement relative to the thin film layer, more precision is needed.

Figure 12:
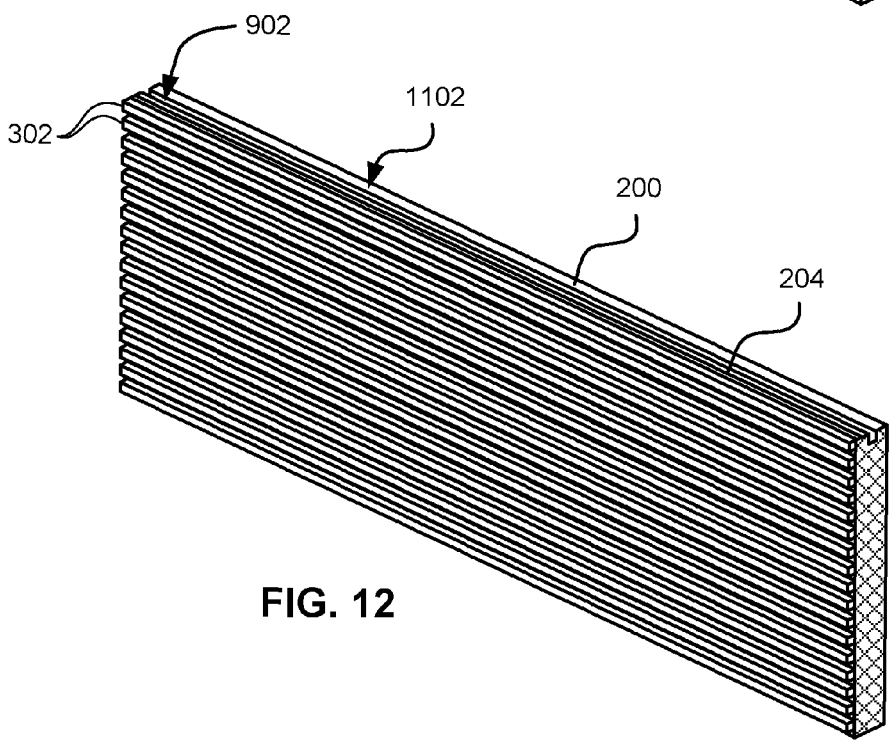
FIG. 12 is a perspective view of the section of wafer of FIG. 11 upon polishing an end thereof.

Accordingly, the end 1102 of the section 200 is polished. Conventional lapping techniques may be used. Conventional polishing techniques may be used. Such polishing may be performed before or after the end 1102 of the section 200 is lapped for setting the approximate stripe height of the transducers. FIG. 12 depicts the section 200 with a polished end 1102. Once polished, the polished surface of the end 1102 is amenable to use of optical detection techniques to identify features thereof. For example, features in the thin film layer 204 are readily observable once the polishing is performed.

Optical detection of a reflective feature on the polished end as well as the free end of the closure may be used to determine the extent of lapping of the closure. Such reflective feature may be any optically discernable portion of the polished end. For example, the reflective portion may be a portion of the circuitry such as a shield, an electronic lapping guide, etc. that are now clearly discernable on the polished surface. In another approach, the reflective feature may be a fiducial built into the thin film layer 204 at a predefined location. In yet another approach, the reflective feature may be a portion having a different color or contrast than an adjacent portion, e.g., the first layer or first few layers of the thin film layer on the substrate. Conventional optical detection techniques may be adapted for the purposes described herein, as would be appreciated by one skilled in the art upon reading the present disclosure. Machine vision techniques may be used. Preferably, the resolution of the optical detector is in the sub-micron level.

Using information derived from the optical detection, the present length of the closure 302 can be determined, and an extent of additional lapping needed can be calculated. Once lapped, the closure defines a tape bearing surface between the outer edge of the closure 302 and the thin film layer 204. Where a portion of the circuitry exposed on the polished end is used as the optical landmark for the bearing surface slot positioning, the length of the tape bearing surface between the closure edge and that portion of the circuitry may be very accurately defined.

The closures can be lapped to any desired length. Preferably, a length of each of the closures after the lapping is between about 3 and about 30 microns so that tape tenting occurs above the transducers when the magnetic recording tape passes over the closure at a wrap angle in a range of about 0.1 to about 1.5 degrees. Such tape tenting may prevent asperities and other defects on the tape from engaging the thin film layer 204 and causing damage thereto such as smearing of conductive material across the sensor, thereby creating a short.

If the any of the closures on the section are lapped beyond the desired length, the closures may be removed, e.g., by dissolving the adhesive coupling the closures to the section. Any solvent operable to dissolve the particular adhesive used may be used. In one approach, the closures may be removed using N-methyl-2-pyrollidone (NMP). For example, hot NMP may be used, e.g., where the NMP is at a temperature of greater than about 65 degrees centigrade when applied to the closures. Then the foregoing processes may be repeated to reapply the closures and set their lengths.

Figure 13:
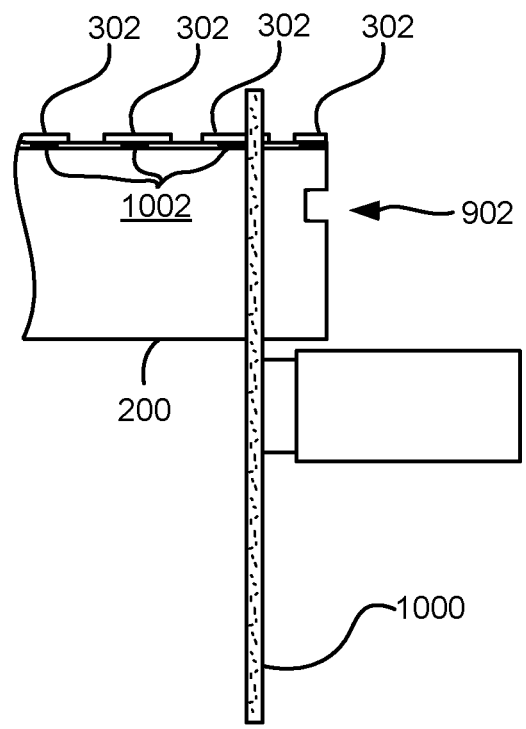
FIG. 13 is a side view depicting cutting of a row from a section of wafer.

Referring to FIG. 13, a row is then sliced from the section 200. Conventional cutting techniques may be used to slice the row from the section 200 adjacent the transducers 1002. For example, a blade 1000 of conventional construction may be used to cut through the section 200.

Figure 14:
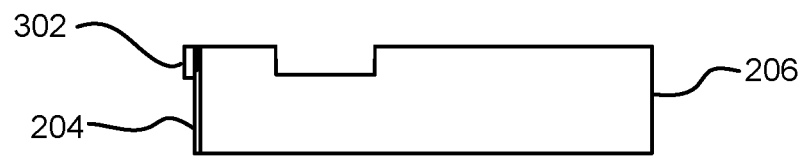
FIG. 14 is a side view of a row cut from a wafer.
Figure 15:
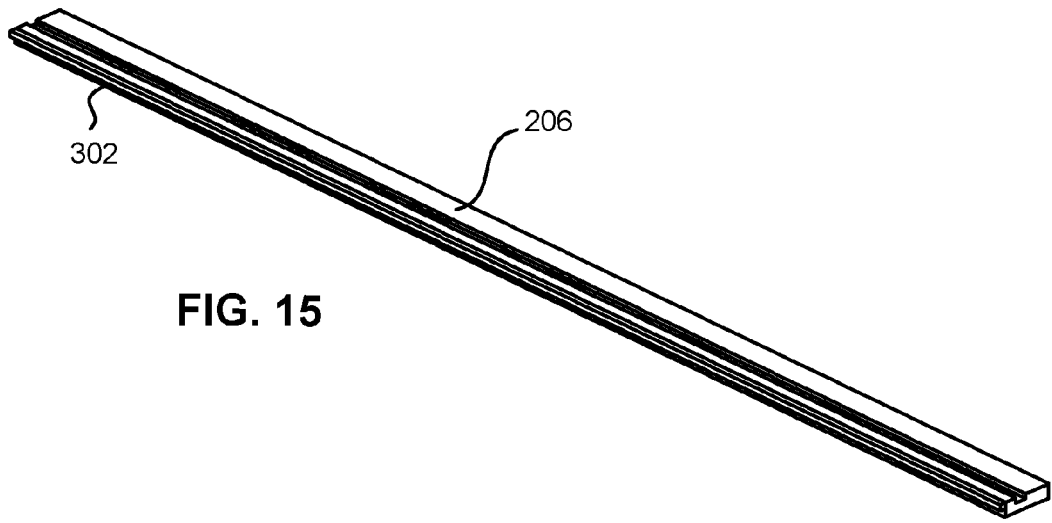
FIG. 15 is a perspective view of a row cut from a wafer after a back lap process to reduce a thickness thereof.

FIG. 14 depicts the row cut from the section 200. Various process steps may be performed on the row. For example, a back lapping step may be performed on the substrate 206 to reduce its thickness, and/or to create a surface suitable for subsequent processing. FIG. 15 depicts the row after back lapping.

Figure 16:
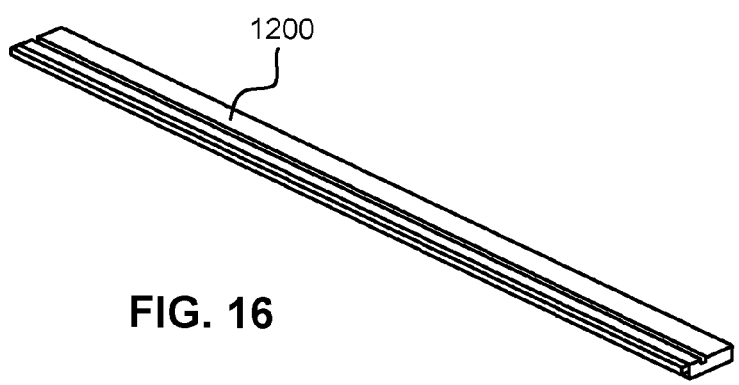
FIG. 16 is a perspective view of a chip cut from a row.

If the row includes multiple head images, the row may be cut into chips. Preferably, the rows are cut into individual thin film elements, or chips 1200, using conventional methods. See FIG. 16, which illustrates one chip 1200.

Figure 17:
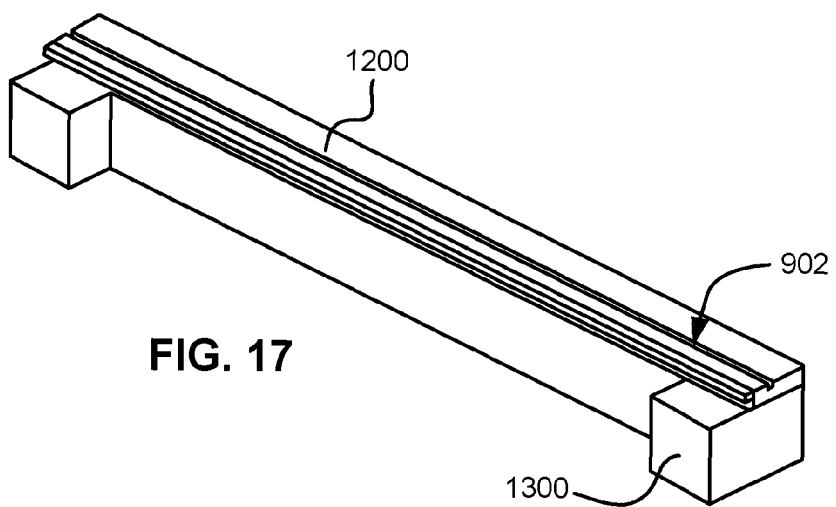
FIG. 17 is a perspective view of a U-beam with a chip coupled thereto, thereby forming a module.

Each chip 1200 may be coupled to a beam such as a U-beam 1300, as shown in FIG. 17.

Additional processes may be performed, before or after the chip 1200 is coupled to a beam. For example, the row or chip may be lapped again, using conventional techniques such as KISS lapping on a pre-charged plate. Milling may be performed, e.g., for preparing the polished surface for application of a protective overcoat thereto. A conventional protective overcoat may be applied to the polished end.

Subsequently, a portion of the chip 1200 located on an opposite side of the slot 902 relative to the circuitry in the thin film layer 204 may be removed using a conventional technique such as grinding. In a preferred embodiment, a conventional grinding wheel in a system with machine vision may be used to remove the material at the proper location. FIG. 18 shows the chip 1200 upon removal of the material. The edge 1404 of the slot 902 that remains defines a skiving edge of the tape bearing surface of the chip. Preferably, the grinding operation is performed in one pass.

Two or more beams 1300 may eventually be coupled together to form a head.

Preferably, the closures are angled upwardly into the tape bearing surface (i.e., as they approach each other, preferably at an angle between 0.1 to 2 degrees, with respect to the horizontal line between them. The angle of the closures may be used to create an air skiving effect for close head-tape spacing and/or to create a tenting effect.

Preferably, the wrap angle between the two modules creates the desired tenting over the read transducers.

As shown in FIG. 18, the chip 1200 is at least as wide as a tape for which the tape bearing surface is designed. However, other embodiments are contemplated. For example, shorter chip may be fabricated, as described immediately below.

According to various embodiments, the processes described herein may be used to form a partial span flat or contoured head "chip," the chip being embeddable in a flat or contoured beam, such that the chip closure extends beyond the beam edges. For example, the rows may be cut into individual partial span heads, or chips 1600, using traditional methods. See FIG. 19, which illustrates a partial span flat profile chip 1600 according to a preferred embodiment. If the chip is to be used in a Linear Tape Open (LTO) head, the preferred length of the chip in a direction perpendicular to the direction of tape travel thereover is preferably less than about 7 to 8 mm, though larger or smaller sizes may be created as well.

Similar processes as those described above with reference to FIGS. 2-16 may be used to form the chip 1600, with the exception of the length of chip cut from the section.

FIG. 20 illustrates a flat profile beam (carrier) 1700 according to one embodiment. One skilled in the art will understand that many different shapes of the beam can be used. For instance, the beam may be block shaped, e.g., have a generally rectangular cross section when viewed from the tape bearing surface. The beam may also include rounded and/or tapered portions. For simplicity and ease of understanding, the following description will be described with reference to a U-shaped beam, or U-beam.

With continued reference to FIG. 20, the U-beam 1700 has a recess 1702 extending into a tape bearing surface 1704 thereof. The U-beam is preferably formed from a blank piece of wafer stock, which is inexpensive to fabricate, but is long enough to fully support the tape. If the U-beam is to be used in an LTO head, the preferred length of the U-beam in the same plane as, but in a direction perpendicular to, the direction of tape travel thereover is preferably less than about 50 mm, and ideally less than about 25 mm, but may be longer. Before the chip is affixed to the U-beam to form the module, the tape bearing surface on one of the U-beams may be lapped or polished to form a smooth tape bearing surface thereon.

Figure 21:
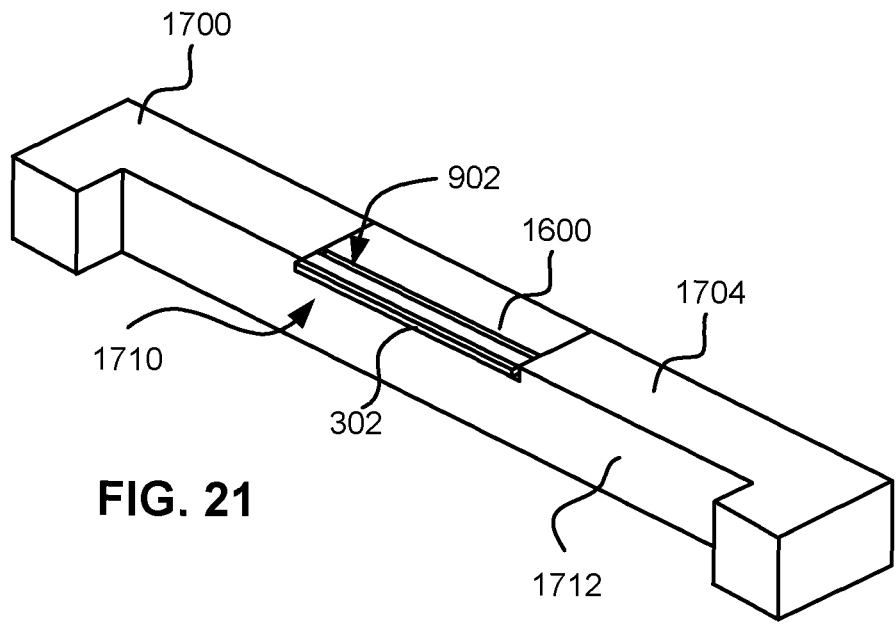
FIG. 21 is a perspective view of a U-beam with a chip coupled thereto, thereby forming a module.

As shown in FIG. 21, a chip 1600 is positioned in the recess of the U-beam such that the face 1710 of the substrate portion of the chip (which contains the device contact pads) is reasonably proximate to the adjacent face 1712 of the U-beam and coupled to the U-beam 1700 by any conventional technique, such as via an adhesive, such that the chip closure extends beyond the beam edges. This forms a module, which is later used to form a complete tape head. The geometry of the chip may be specifically adapted to minimize closure protrusion, and thereby minimize tape deflections effects.

The tape bearing surfaces (of the chip and U-beam) should be as parallel and coplanar as possible because the tape will run across them. However, the tape bearing surfaces do not need to be perfectly coplanar, as this design provides some tolerance for misalignment. Thus, the chip surface envelope may deviate from the tape bearing surface of the U-beam by several micrometers. This tolerance relief greatly reduces fabrication costs.

Figure 22:
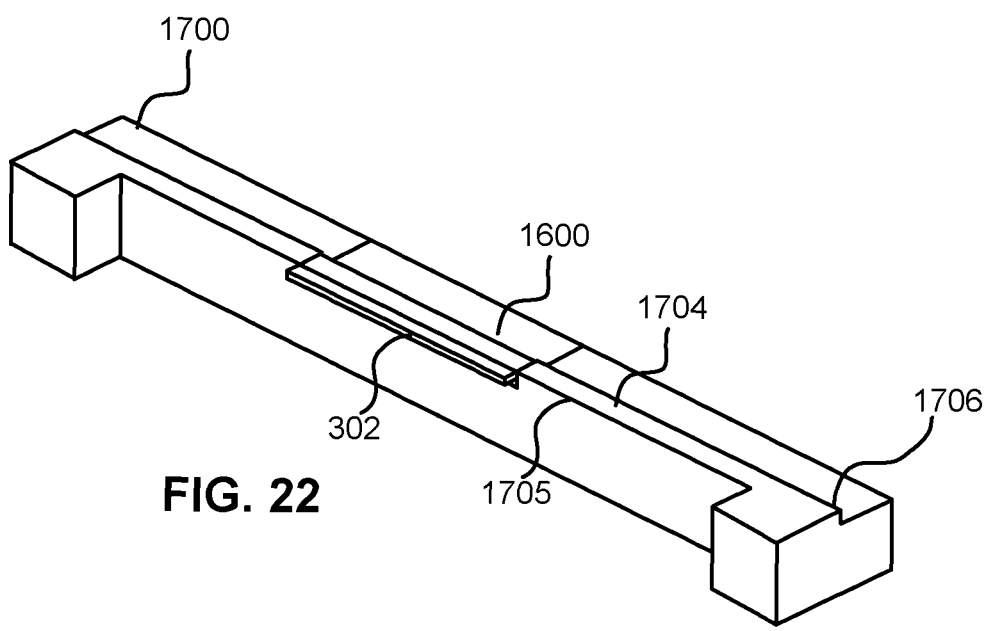
FIG. 22 is a perspective view of a module upon forming of a skiving edge thereon.

As shown in FIG. 22, the tape bearing surface of a U-beam 1700 and chip 1600 can be processed, e.g., by grinding, to form a skiving edge 1706. Similar techniques as those described above with reference to FIG. 18 may be used.

Two beams 1700 can be coupled together to form a head with spacing between the central portions of the beams, such as a head of the type shown in FIG. 1. Preferably skiving edges are formed on both modules to enable bi-directional reading and writing. In addition, the inside edges 1705 may be made sharp so that these will also skive air. Alternatively, the inside edges 1705 may be rounded if desired.

Preferably, the closures are angled upwardly into the tape bearing surface (i.e., as they approach each other, preferably at an angle between 0.1 to 2 degrees, with respect to the horizontal line between them. The angle of the closures may be used to create an air skiving effect for close head-tape spacing and/or to create a tenting effect.

Preferably, the wrap angle between the two modules creates the desired tenting over the read transducers.

All of the read and/or write elements in the head are preferably positioned in the chips. Note that each chip can have multiple read and write elements, such as interleaved read/write elements. Alternatively, one chip can have all write elements and the other chip can have all read elements. Other combinations are also possible. In this way, a read/write head can be formed.

Figure 23:
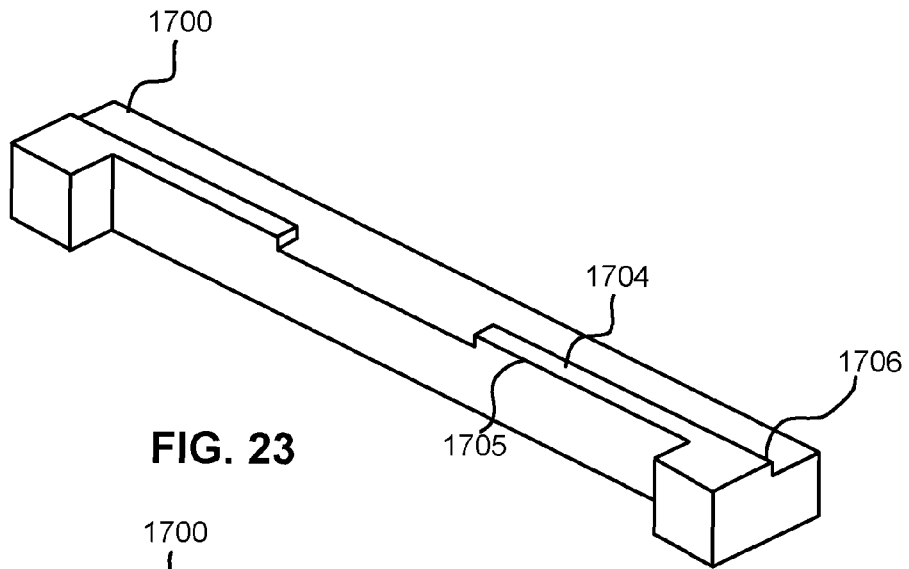
FIG. 23 is a perspective view of a U-beam according to one embodiment.
Figure 24:
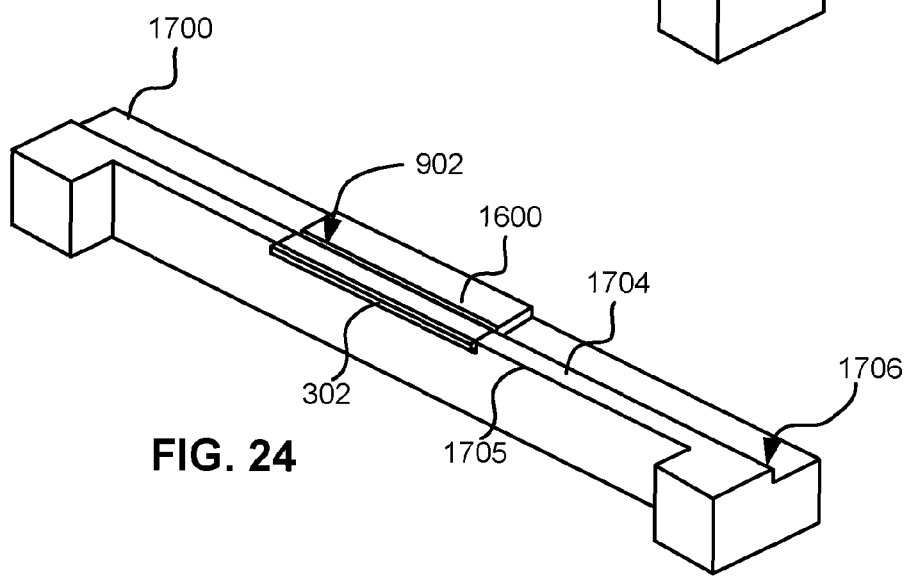
FIG. 24 is a perspective view of a U-beam with a chip coupled thereto, thereby forming a module.
Figure 25:
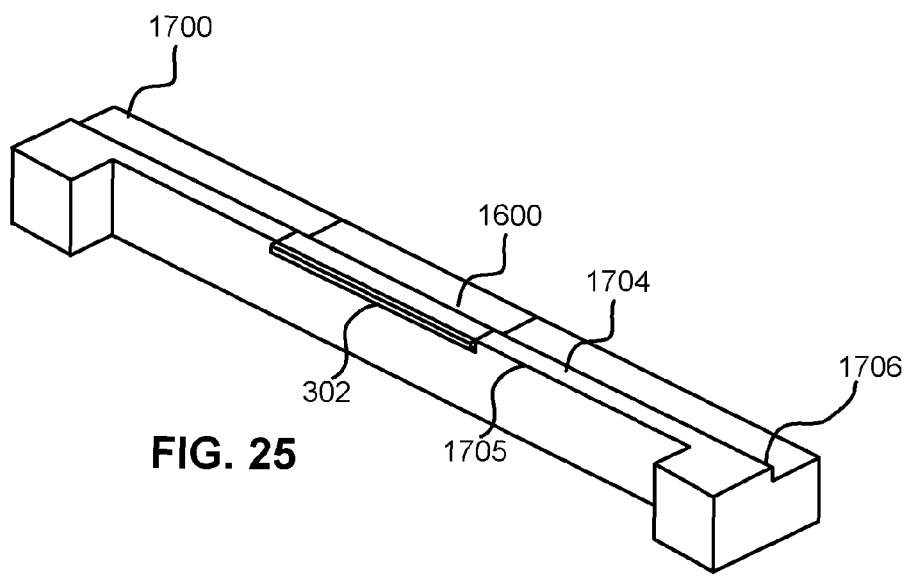
FIG. 25 is a perspective view of a module upon forming of a skiving edge thereon.

FIGS. 23-25 illustrate an alternate embodiment having components similar to those of FIGS. 19-22, and accordingly have common numbering therewith. As shown in FIG. 23, the beam 1700 has a rear skiving edge 1706 already formed thereon. In FIG. 24, the chip 1600 is coupled to the beam 1700. FIG. 25 shows the module after a portion of the chip 1600 behind the bearing surface slot is removed.

The heads created by the processes described herein can be used in magnetic recording heads for any type of magnetic media, including but not limited to disk media, magnetic tape, etc.

While various embodiments have been described above, it should be understood that they have been presented by way of example only, and not limitation. For example, the structures and methodologies presented herein are generic in their application to all types of thin film devices. Thus, the breadth and scope of a preferred embodiment should not be limited by any of the above-described exemplary embodiments, but should be defined only in accordance with the following claims and their equivalents.

What is claimed is:

1. A method, comprising:
    coupling closures to a section having a plurality of rows of transducers formed on a substrate, the closures being coupled to the section on an opposite side of the transducers as the substrate;
    coupling the section to a lapping-resistant guide, wherein the closures protrude beyond a lap-stop end of the guide; and
    lapping the closures for shortening the closures in a direction toward the transducers, wherein the lapping is terminated after the guide contacts a lapping surface.

2. The method as recited in claim 1, wherein the guide includes hot pressed boron carbide.

3. The method as recited in claim 1, wherein the guide at least partially encircles a lateral periphery of the section.

4. The method as recited in claim 1, wherein the guide fully encircles a lateral periphery of the section.

5. The method as recited in claim 1, wherein the guide biases the section toward the lapping surface during the lapping, wherein the biasing diminishes as the guide contacts the lapping surface.

6. The method as recited in claim 1, wherein a length of each of the closures after the lapping is between about 3 and about 30 microns.

7. The method as recited in claim 1, further comprising slicing a row from the section after the lapping; and incorporating at least a portion of the row in a magnetic tape recording head.

8. The method as recited in claim 7, wherein the portion of the row is at least as wide as a tape for which the magnetic tape recording head is designed.

9. The method as recited in claim 7, wherein the at least a portion of the row is less than a width of a tape for which the magnetic tape recording head is designed.

* * * * *